(12) United States Patent
Wang et al.

(10) Patent No.: US 8,265,281 B2
(45) Date of Patent: Sep. 11, 2012

(54) IP SERVICE AUTHORIZATION IN WIRELESS COMMUNICATIONS NETWORKS

(75) Inventors: Jun Wang, La Jolla, CA (US); Masakazu Shirota, Yokohama (JP)

(73) Assignee: QUALCOMM Incorporated, San Diego, CA (US)

( * ) Notice: Subject to any disclaimer, the term of this patent is extended or adjusted under 35 U.S.C. 154(b) by 681 days.

(21) Appl. No.: 12/167,084

(22) Filed: Jul. 2, 2008

(65) Prior Publication Data

US 2009/0025059 A1   Jan. 22, 2009

Related U.S. Application Data

(60) Provisional application No. 60/948,658, filed on Jul. 9, 2007.

(51) Int. Cl.
   *H04K 1/00* (2006.01)
(52) U.S. Cl. ........................................... 380/270
(58) Field of Classification Search .................... 380/270
   See application file for complete search history.

(56) References Cited

U.S. PATENT DOCUMENTS

| | | | |
|---|---|---|---|
| 2004/0193712 A1* | 9/2004 | Benenati et al. | 709/225 |
| 2005/0041808 A1 | 2/2005 | He | |
| 2006/0015590 A1* | 1/2006 | Patil et al. | 709/220 |
| 2008/0229403 A1* | 9/2008 | Oswal et al. | 726/12 |

FOREIGN PATENT DOCUMENTS

| | | |
|---|---|---|
| JP | 2007509575 A | 4/2007 |
| RU | 2289205 C2 | 12/2006 |
| TW | 200423604 | 11/2004 |
| TW | 200711496 | 3/2007 |
| WO | WO02073993 A1 | 9/2002 |
| WO | WO02082207 A2 | 10/2002 |

OTHER PUBLICATIONS

Arkko, J. et al., "Extensible Authentication Protocol Method for 3rd Generation Authentication and Key Agreement" (EAP-AKA); Internet Engineering Task Force (IETF) Draft, Dec. 21, 2004, XP015010284, section 4.1.1.5.
Arkko, J. et al: "Network Discovery and Selection Problem" Internet Engineering Task Force (IETF) Draft, Jun. 5, 2007, XP015051211, p. 19, paragraph 1.
International Search Report and Written Opinion—PCT/US2008/069569, International Searching Authority—European Patent Office, Jun. 6, 2009.
Taiwan Search Report—TW097125998—TIPO—Jan. 11, 2012.

* cited by examiner

*Primary Examiner* — Christopher Brown
(74) *Attorney, Agent, or Firm* — Francois A. Pelaez; Darren M. Simon

(57) ABSTRACT

Systems and methodologies are described that facilitate protocol address assignment using protocols compatible with specified domains for mobile devices. Devices can request wireless network access through a gateway, which can forward an authentication/authorization request to an authentication server. Upon successful authentication, the authentication server can transmit one or more domain identifiers related to the device or a user thereof. Using the domain identifier, compatible protocols can be determined for use in configuring the device for subsequent domain communication.

27 Claims, 9 Drawing Sheets

IP SERVICE AUTHORIZATION IN WIRELESS COMMUNICATIONS NETWORKS

CROSS-REFERENCE TO RELATED APPLICATIONS

This application claims the benefit of U.S. Provisional Patent application Ser. No. 60/948,658 entitled "AUTHORIZATIONS OF IP SERVICES BASED ON DOMAIN FOR DUAL IP STACK" which was filed Jul. 9, 2007. The entirety of the aforementioned application is herein incorporated by reference.

BACKGROUND

I. Field

The following description relates generally to wireless communications, and more particularly to protocol service authorization in wireless communications networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

The base stations can facilitate communication between the mobile devices and core wireless network components, such as authentication, authorization, and accounting (AAA) servers, one or more gateways, or any service providing components. For example, the core network components can be utilized to authenticate and/or authorize mobile devices for communicating with other devices or components of the wireless network. Moreover, an AAA server can verify a user of the mobile device with a stored profile, and upon successful authentication/authorization, can notify a gateway. The gateway can then assign access protocol services to the mobile device to facilitate subsequent communications. However, the development of different communications protocols and different domains utilizing different combinations of protocols can impede wireless network support for multiple domains.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating access protocol assignment following authentication/authorization based at least in part on a domain specified in a user profile for a device receiving the protocol assignment. For example, an authentication, authorization, and accounting (AAA) server can authenticate a user of a mobile device through an access gateway (AGW) or other core network component. The AAA server can provide one or more identifiers for domains available to the mobile device; this can be based on a profile, for example. The AGW or other component can utilize the domain identifier to determine one or more protocols compatible with the mobile device and/or domain. Subsequently, the AGW can establish a session with compatible protocol services with the mobile device.

According to related aspects, a method for providing protocol services based at least in part on a desired domain for a mobile device is provided. The method can include receiving a domain identifier related to a user of a mobile device and determining one or more protocols compatible with a domain according to the domain identifier. The method can additionally include configuring communication parameters related to the one or more protocols for the mobile device to facilitate subsequent communication in the domain.

Another aspect relates to a wireless communications apparatus. The wireless communications apparatus can include at least one processor configured to determine a compatible communication protocol for a mobile device based at least in part on a received domain identification as well as configure communication parameters for the mobile device pursuant to the compatible communication protocol. The wireless communications apparatus can also include a memory coupled to the at least one processor.

Yet another aspect relates to a wireless communications apparatus that establishes protocol communications with a wireless network mobile device. The wireless communications apparatus can comprise means for determining a compatible communications protocol according to a received domain identifier related to a mobile device. The wireless communications apparatus can additionally include means for configuring protocol communication parameters for the mobile device to be utilized in subsequent communication based on the compatible communications protocol.

Still another aspect relates to a computer program product, which can have a computer-readable medium including code for causing at least one computer to receive a domain identifier related to a user of a mobile device. The computer-readable medium can also comprise code for causing the at least one computer to determine one or more protocols compatible with a domain according to the domain identifier. Moreover, the computer-readable medium can comprise code for causing the at least one computer to configure communication parameters related to the one or more protocols for the mobile device to facilitate subsequent communication in the domain.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
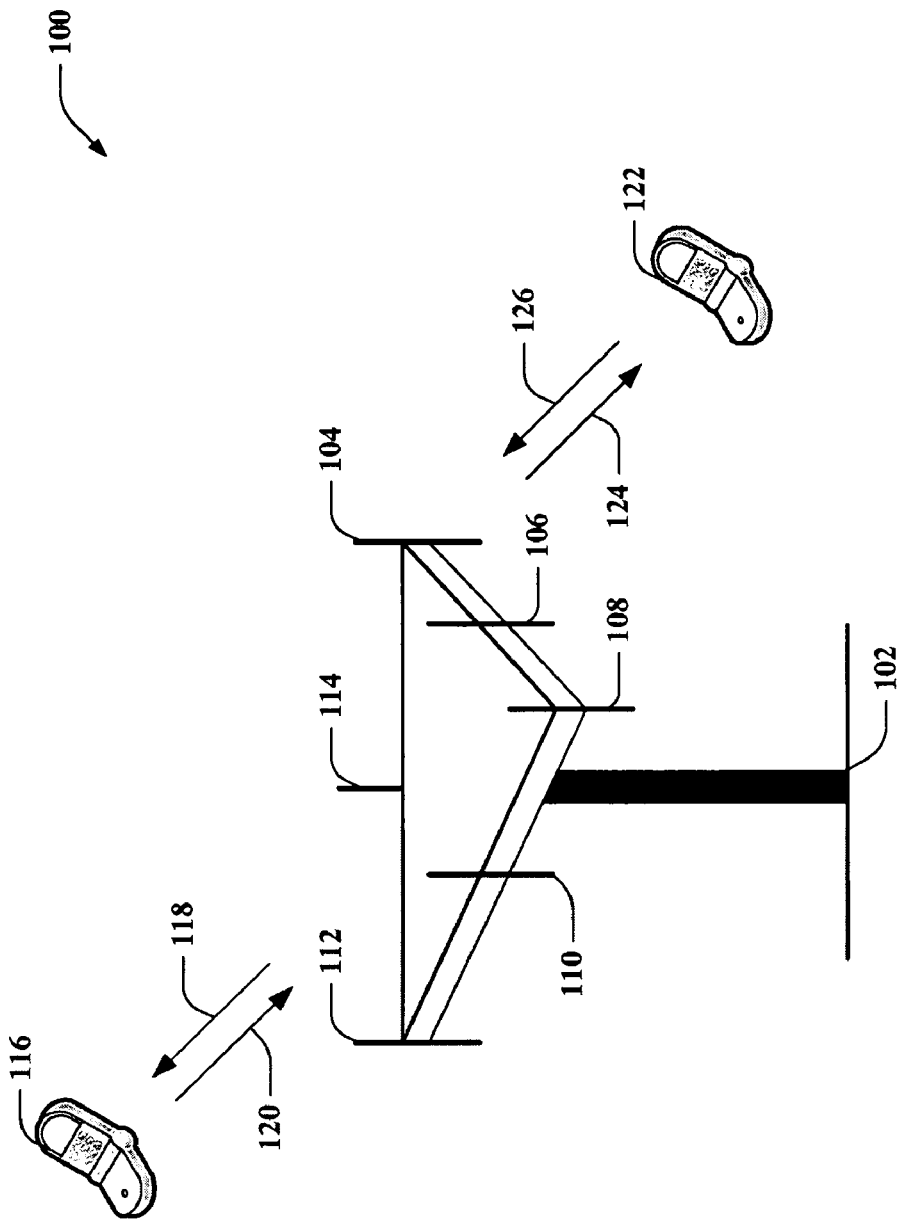
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. Moreover, the base station 102 can provide the mobile devices 116 and/or 122 with access to the wireless network via core network components. For example, the base station 102 can facilitate communications between the mobile devices 116 and/or 122 and a core network to provide services, such as authentication and/or authorization. For example, the base station 102 can be coupled to a radio network controller (RNC) (not shown) that is connected to one or more core network devices, such as a gateway. In one example, a core network authorization, authentication, and accounting (AAA) server (not shown), or other core network component, can authenticate the mobile devices 116 and/or 122 upon receiving a request from the gateway. Upon successful authentication and/or authorization, the AAA server can provide one or more domain identifiers related to the mobile device 116 and/or 122 to the gateway. Based at least in part on the domain identifier, the gateway can utilize a compatible access protocol service and establish a session using a compatible access protocol with the mobile device 116 and/or 122 via base station 102. Subsequently, the mobile device 116 and/or 122 can communicate with the core wireless network through the base station 102, in one example.

Figure 2:
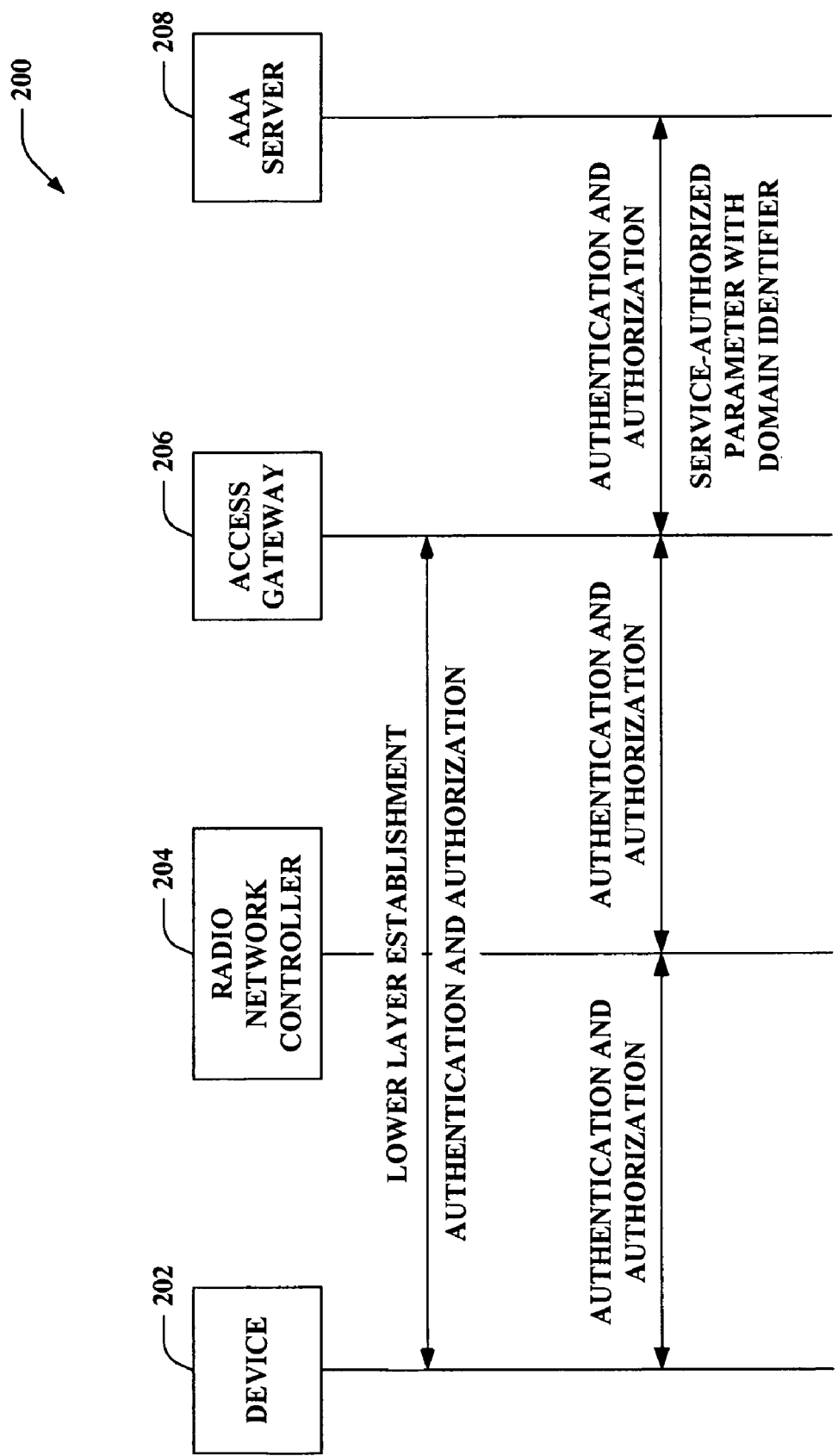
FIG. 2 is an illustration of an example wireless communication system that receives a domain identifier for a device following authentication/authorization.

Turning to FIG. 2, illustrated is a wireless communication system 200 that facilitates device authentication/authorization and subsequent protocol establishment in wireless networks. A device 202, such as a mobile device, can communicate with an access gateway (AGW) 206 through an RNC 204 as described. The AGW 206 can facilitate device 202 communication with core network components of a wireless network. In one example, as shown, the AGW 206 can provide device 202 access to an AAA server 208 to authenticate/authorize the device 202 on the underlying wireless network. Moreover, the device 202 can access different RNCs over time; in some cases, the source and target RNC can utilize the same access gateway 206. While previous protocol utilization required a new protocol address be assigned to the device 202 at each RNC (e.g., simple internet protocol (IP)), technologies have developed where the protocol address can be anchored at the AGW 206 (e.g., mobile IP) such that transferring to a new RNC need not necessarily require a new protocol address.

As shown, device 202 can request lower layer connection establishment and authentication/authorization from AGW 206 through RNC 204. It is to be appreciated that the RNC 204 can connect to the device 202 via one or more base stations (not shown). Following the lower layer establishment, the device 202 can communicate with the AAA server 208 through the AGW 206 to authenticate and/or authorize the device 202 and/or user thereof at an upper-layer with the AAA server 208 of the wireless network. In this regard, the AAA server 208 can store parameters related to the device 202 and/or user thereof that can be compared with those provided by the device 202 upon authentication/authorization request. In one example, where the AAA server 208 successfully authenticates/authorizes the device 202, it can send the success (e.g., service-authorized parameter, as shown) along with one or more domain identifiers related to the device 202 or user thereof, to the AGW 206.

According to an example, the domain identifier can be a portion of a profile transmitted by the AAA server 208 to the AGW 206 on successful authentication and/or authorization. The domain identifier can indicate compatible protocols that can be utilized by the device 202 to communicate in the domain. In one example, the AGW 206 can associate the domain with one or more of the compatible protocols and establish a session with compatible access protocol services with the device 202 using the protocol. For example, the protocols compatible with a specified domain can include one or more of simple IP protocols, such as simple IPv4 and IPv6, mobile protocols, such as mobile IPv4 and IPv6, and/or other protocols. Thus, upon receiving indication of the domain from the AAA server 208, the AGW 206 can determine the one or more compatible protocols and configure a protocol for the device 202 and/or establish a protocol session with the device 202. For example, this can include receiving requests from the device 202 to establish a session based on one or more protocols and denying establishment if the requested protocol is not compatible with the domain, or the AGW 206 can specify one or more available protocols to the device 202, in one example.

As described, the type of protocol used to establish communication with the device 202 can define subsequent communications with the device 202. For example, where a mobile IP protocol is compatible with the domain specified by the AAA server 208 to the AGW 206, if the device 202 transfers communication between radio network controllers, the same communication session can still be utilized if the new radio network controller uses the same AGW 206, for example. In addition, the protocol compatible with the domain related to the device 202 or user can be a simple IP, for example, that is anchored at the RNC 204. Thus, if the device 202 moves to a new RNC, another protocol session can be established.

Figure 3:
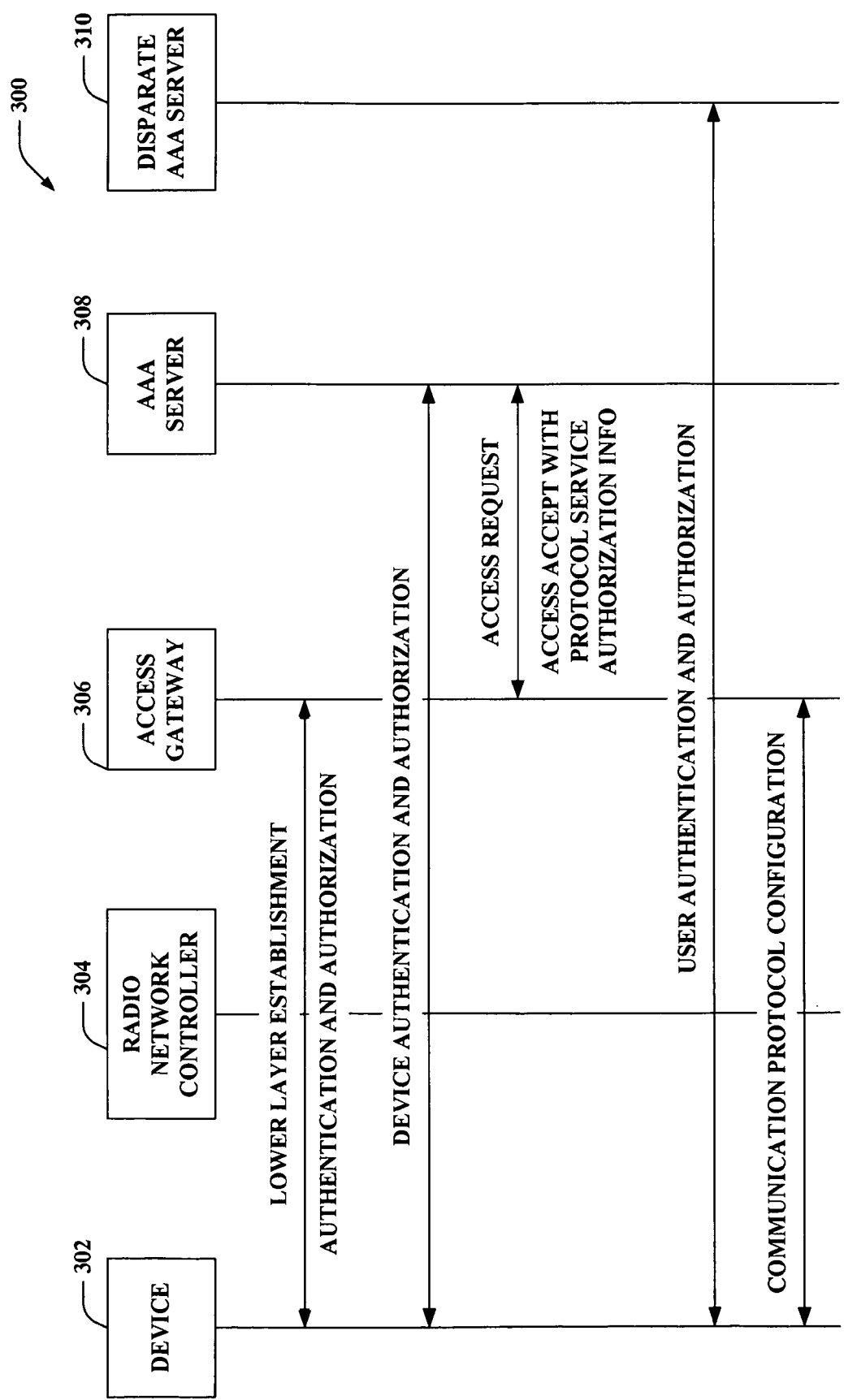
FIG. 3 is an illustration of an example wireless communication system that assigns protocol addresses following domain identification.

Now referring to FIG. 3, illustrated is a wireless communication system 300 that facilitates multiple level device authorization/authentication and subsequent protocol services establishment. As described, a device 302 can communicate with an AGW 306 through an RNC 304 as described. The AGW 306 can facilitate device 302 communications with core network components of a wireless network, such as an AAA server 308 to authenticate/authorize the device 302 on the underlying wireless network. Once the AAA server 308 authentication/authorization is successful, a domain indicator can be sent to the AGW 306 (e.g., automatically or in response to an access request). Moreover, another layer of authentication/authorization can be desired for the user of the device 302 via a disparate AAA server 310. Thus, a protocol can be determined to be compatible with the domain of the disparate AAA server 310, and user authentication and/or authorization can be appropriately requested using the protocol in this regard.

Accordingly, in this example, lower layer connection establishment and authentication/authorization can occur between the device 302 and AGW 306 (via RNC 304). Following connection establishment, the device 306 can be authenticated and/or authorized by the AAA server 308 as described. Further, the AAA server 308 can send a domain identifier to the AGW 306 on successful authentication/authorization, which can be utilized to determine one or more appropriate protocols that can be utilized for communication with the domain. It is to be appreciated that this can be part of a user profile transmission, an explicit identification of the domain and/or compatible protocols, etc. However, another layer of authentication/authorization can be desired for the user of the device 302. In this regard, the device 302 can request user authentication/authorization with the disparate AAA server 310 via the AGW 306, and the AGW 306 can ensure an appropriate protocol is utilized for the communication as determined above. Thus, the AGW 306 can configure a protocol and assign a protocol address to the device 302 depending on the protocol authorization information provided by AAA server 308.

As mentioned previously, the protocol authorization information can comprise a domain identifier, from which the AGW 306 can determine compatible protocols. It is to be appreciated that the AAA server 308 can determine the compatible protocols and communicate the information to the AGW 306. Moreover, the protocol authorization information can include, in one example, a user profile for the mobile device and/or user thereof comprising the desired domain. Once the AGW 306 has determined compatible protocols, it can receive a request for protocol address assignment from the device 302. In one example, the device 302 can request a type of protocol, and the AGW 306 can grant or deny the request based on whether the requested protocol is one of the determined compatible protocols. In an alternate or additional example, the AGW 306 can transmit one or more of the compatible protocols to the device 302.

Figure 4:
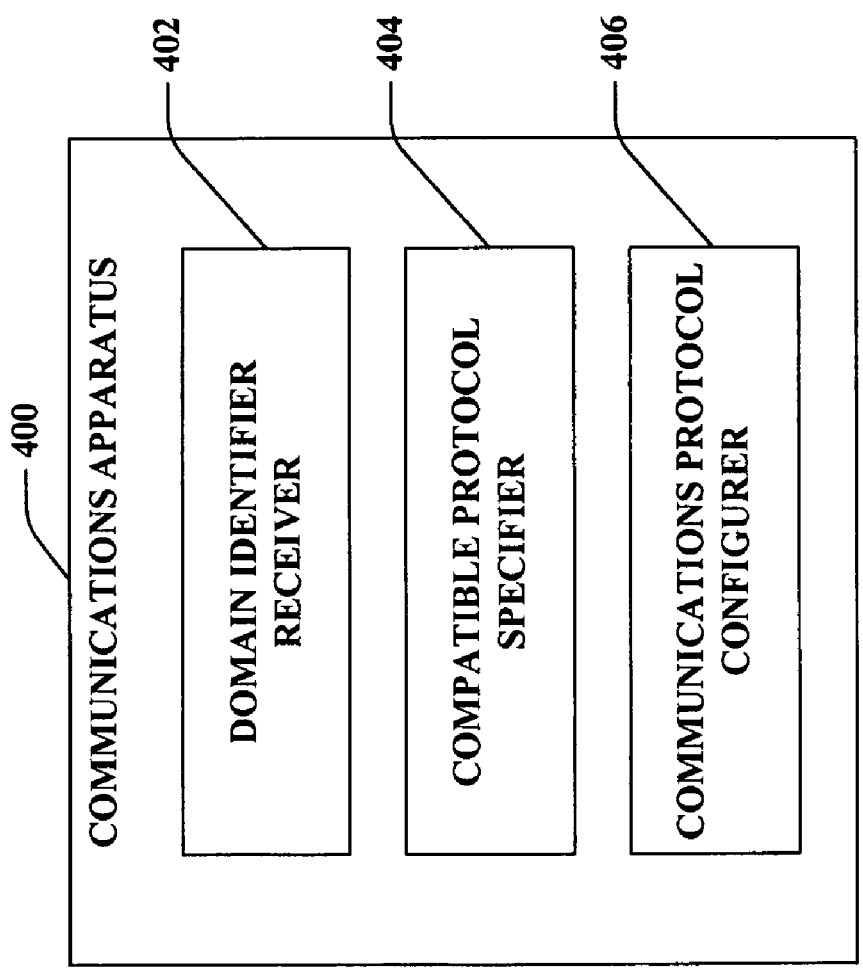
FIG. 4 is an illustration of an example communications apparatus for employment within a wireless communications environment.

Referring now to FIG. 4, illustrated is a communications apparatus 400 for employment within a wireless communications environment. The communications apparatus 400 can be an AGW, AAA, other core network component, a base station, a mobile device, and/or a portion thereof, or substantially any communications apparatus that receives data transmitted in a wireless communications environment. The communications apparatus 400 can include a domain identifier receiver 402 that can obtain a domain identification for a mobile device from one or more disparate sources, a compatible protocol specifier 404 that can determine one or more protocols useable with the domain identified in the domain identification, and a communications protocol configurer 406 that can establish a protocol for communication with a device (including determining an address, such as an IP address to utilize in communicating with the mobile device, domain name system (DNS) configuration, etc.) based at least in part on the one or more useable protocols.

According to an example, the domain identifier receiver 402 can receive an identification of one or more domains useable by a mobile device. The identification can come from one or more core network components, the mobile device, one or more related base stations, etc. The domain identification can be related to one or more services requested by the mobile device or those available to the mobile device, and can be transmitted, in one example, from an AAA server following authentication of the mobile device and/or a user thereof. The compatible protocol specifier 404 can determine one or more protocols compatible with the domain identified. For example, the protocols can be internet protocols as described, such as a simple IP or mobile IP, or disparate versions thereof, and/or the like. This can come from a stored lookup table indicating protocols available for given domains, a query to one or more devices, an inference made from other domain compatible protocols, and/or the like.

The communications protocol configurer 406 can configure a protocol for the mobile device based at least in part on the determined compatible protocol(s) for the domain. This can include assigning a protocol address to the mobile device, setting DNS server parameters, and/or the like. In this regard, the communications apparatus 400 can establish connection with the mobile device utilizing the protocol configuration, which can entail responding to a connection request from the mobile device and/or offering the mobile device available protocols specified by the compatible protocol specifier 404. In the former example, where the mobile device requests a protocol not supported by the related domain, the communications apparatus can require the mobile device to specify a different protocol and/or provide the list of available protocols. Moreover, in this regard, underlying network components need not provide substantially all possible service authorization information to the AGW when mobile device authentication is completed; rather, the communication apparatus 400 can simply operate with the protocols compatible for the identified domain.

Figure 5:
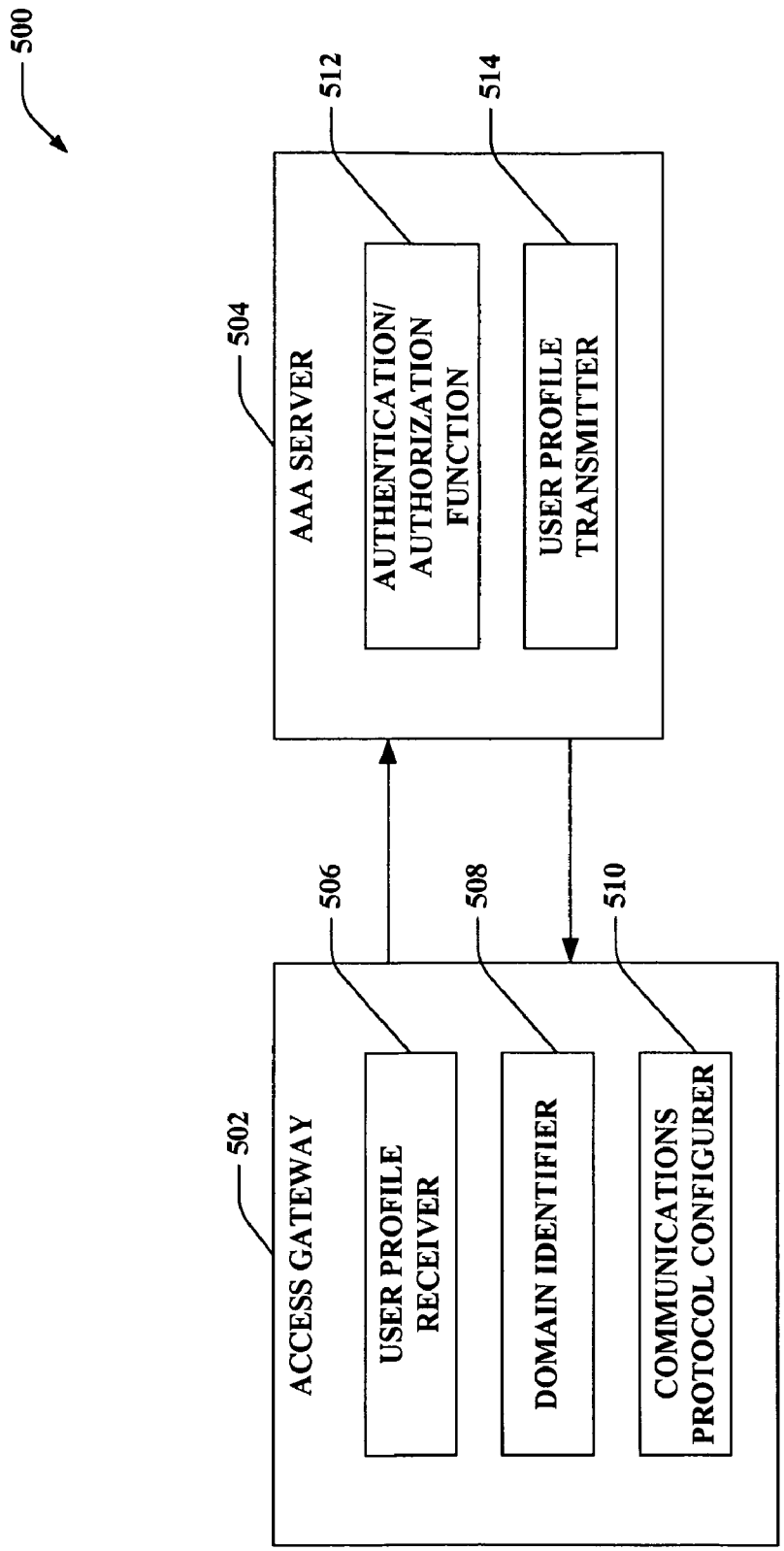
FIG. 5 is an illustration of an example wireless communications system that effectuates determining a domain for a mobile device and compatible protocols.

Now referring to FIG. 5, illustrated is a wireless communications system 500 that facilitates compatible IP service utilization based at least in part on a domain identifier. The system 500 includes an AGW 502 that communicates with an AAA server 504 (and/or any number of mobile devices (not shown) or RNCs (not shown), for example to access the mobile devices). The AGW 502 can provide core wireless network access to one or more devices, and the AAA server

504 can authenticate and/or authorize the devices on the wireless network, in one example. Also, the components and functionalities shown and described below in the AGW 502 can be present in the AAA server 504 and vice versa, in one example.

The AGW 502 can comprise a user profile receiver 506 that can obtain a user profile related to an authenticated mobile device, a domain identifier 508 that can determine a domain related to the user profile, and a communications protocol configurer 510 that can determine a protocol to use in communicating with the mobile device based at least in part on the related domain and configure parameters for the protocol, such as a device address (e.g., IP address), DNS server settings, and/or the like. For example, as described, the domain can be compatible with one or more types of protocols; thus, once the domain is determined, the AGW 502 can receive communication requests from a related mobile device and configure the protocol based at least in part on the compatible domain protocols and/or a protocol specified by the device.

The AAA server 504 comprises an authentication/authorization function 512 that can authenticate and/or authorize a mobile device, or user thereof, for communication with an underlying network as well as a user profile transmitter 514 that can send a user profile to the AGW 502 upon successful authentication/authorization. Thus, in one example, the AGW 502 can request authentication/authorization for a mobile device from the AAA server 504. The authentication/authorization function 512 can perform the authentication/authorization; in one example, this can entail comparing parameters specified by the mobile device to those stored in an underlying network and/or the like. If authentication and/or authorization are successful at the AAA server 504, the user profile transmitter 514 can transmit a profile related to the mobile device or user thereof to the AGW 502.

In one example, the user profile can be provided in response to an access request to the AGW 502 from the AAA server 504 as well. The user profile receiver 506 can receive the profile and/or domain indicator transmitted from the AAA server 504, which can specify one or more domains compatible with the mobile device and/or user. The domain identifier 508 can determine the one or more domains and compatible protocols for the domain(s). Thus, the AGW 502 determines possible protocols for desired communication without exposing substantially all protocols for communicating with the mobile device. The communications protocol configurer 510 can configure protocol parameters for the mobile device to utilize in subsequent communications, such as a protocol address, etc., to facilitate valid protocol service access in the specified domain. Subsequently, the AGW 502 can facilitate proper domain communication in the wireless network for the mobile device utilizing compatible protocols. It is to be appreciated that the authentication can have multiple phases, for example where the AAA server 504 is not of the same service provider as the mobile device. In this regard, the AGW 502 can facilitate device communication with the disparate AAA server to receive additional user authentication and/or authorization using the compatible protocol, in one example.

Figure 6:
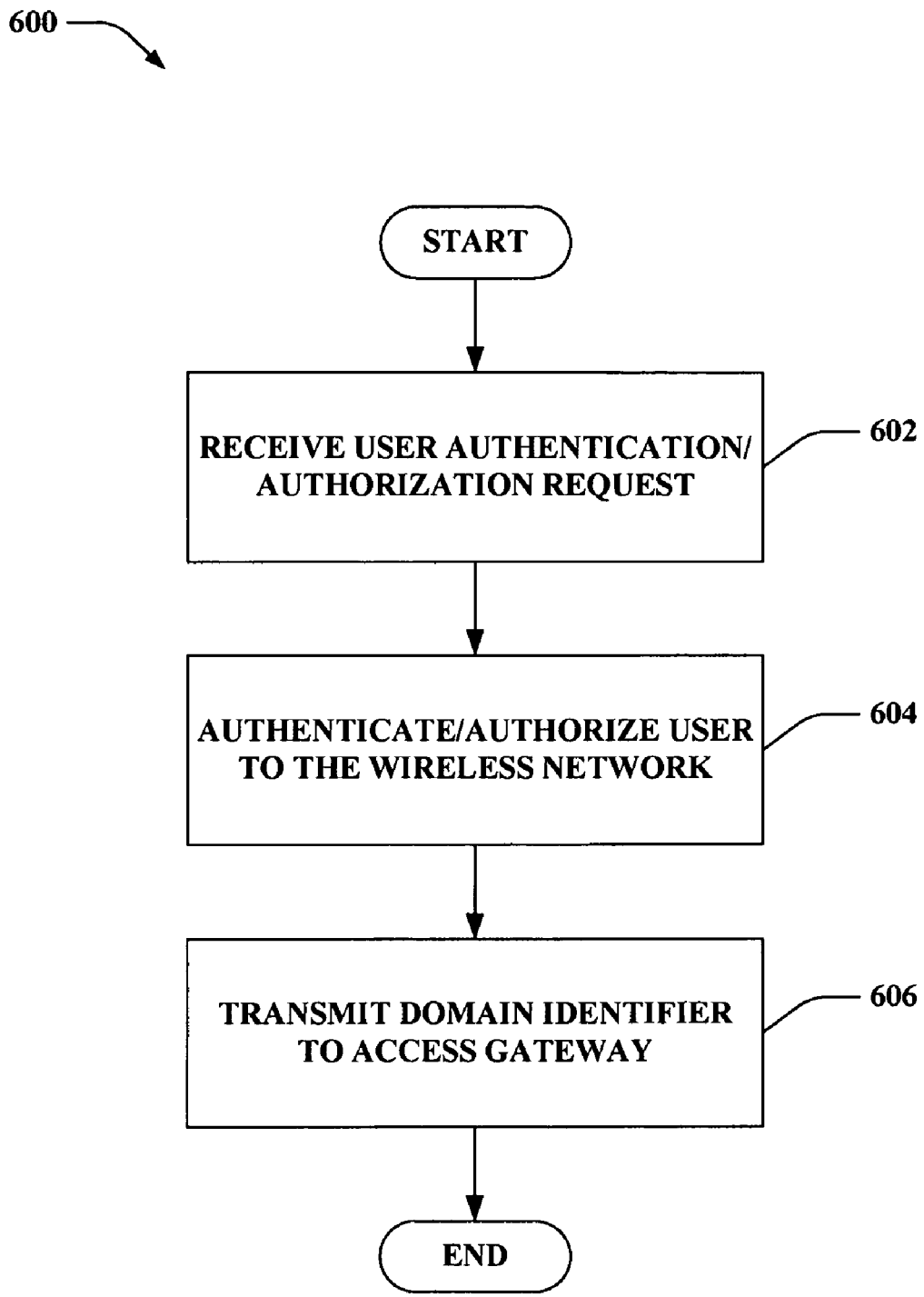
FIG. 6 is an illustration of an example methodology that facilitates transmitting a domain identifier following successful authentication.
Figure 7:
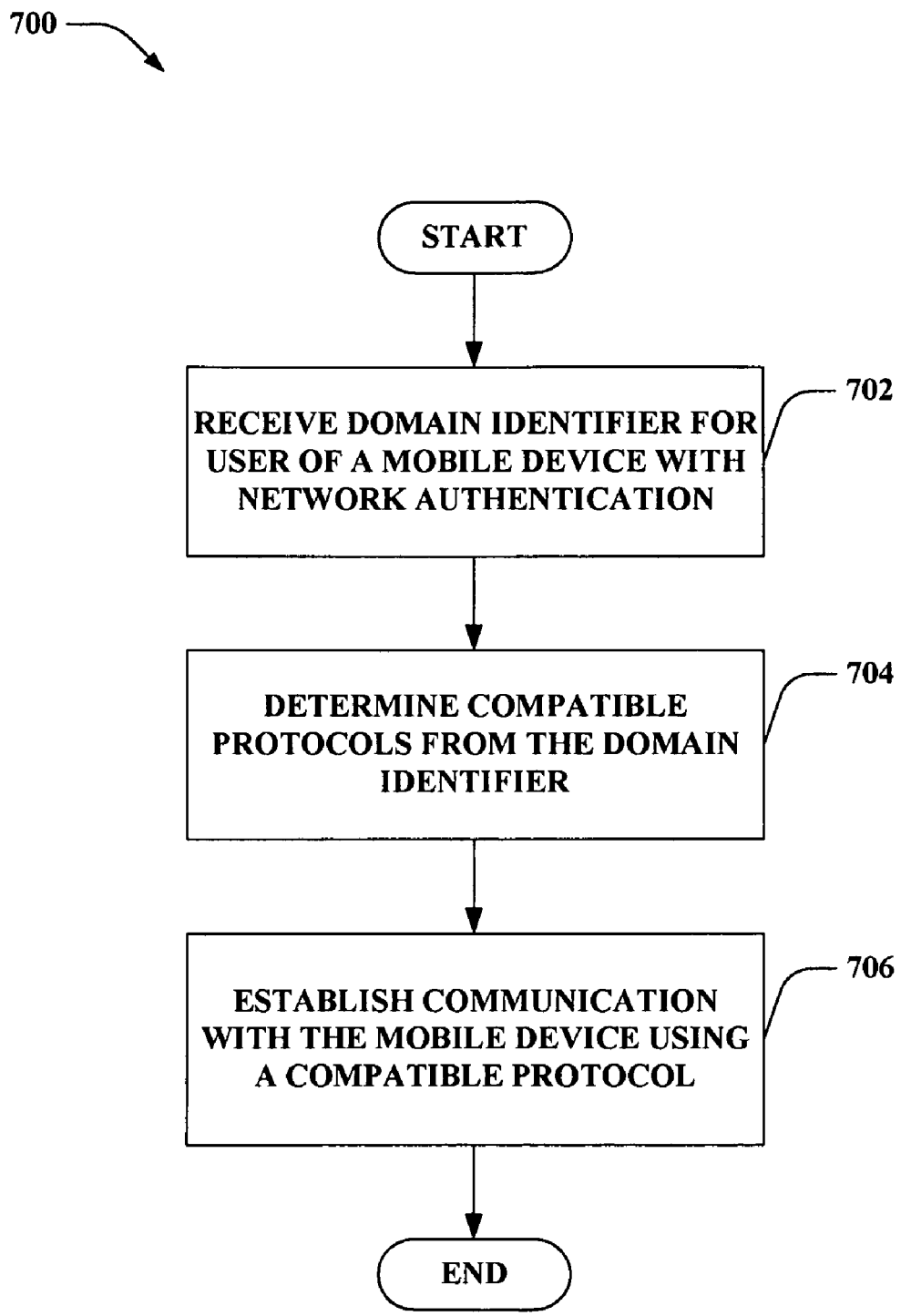
FIG. 7 is an illustration of an example methodology that facilitates establishing connection with a device utilizing a protocol compatible with a specified domain.

Referring to FIGS. 6-7, methodologies relating to selecting protocol services for mobile device communications following device and/or user authentication and/or authorization are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 6, a methodology 600 that facilitates transmitting domain identifiers following device and/or user authentication/authorization for wireless networks is displayed. At 602, a user authentication/authorization request can be received for a mobile device or user thereof. As described, the request can be made to allow the mobile device to access additional wireless network resources, for example. At 604, the user can be authenticated/authorized to the wireless network. As described, this can also relate to a mobile device utilized by the user. At 606, a domain identifier can be transmitted to an access gateway upon successful authentication/authorization. As mentioned, the domain identifier can be transmitted as part of a user profile, in one example, and can identify one or more domains to be utilized. This can be used, in one example, to determine compatible protocols for establishing communications with the user and/or device.

Turning to FIG. 7, illustrated is a methodology 700 that facilitates establishing protocol communications with a mobile device based at least in part on domain identification. At 702, a domain identifier for a user of a mobile device can be received along with network authentication. Thus, as described, a mobile device or user thereof can be authenticated on a wireless network. This can involve utilizing an AAA server, in one example. Once authenticated/authorized, a profile for the user or device can be received. At 704, compatible protocols can be determined from the domain identifier. As mentioned, the protocols can be IP protocols, such as simple IP, mobile IP, versions thereof, etc., and different domains can support different protocols. Thus, by determining the domain for a user or device, compatible protocols can be determined, and at 706, communication can be established with the mobile device using a compatible protocol.

It will be appreciated that, in accordance with one or more aspects described herein, inferences can be made regarding selecting protocols for domain access as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
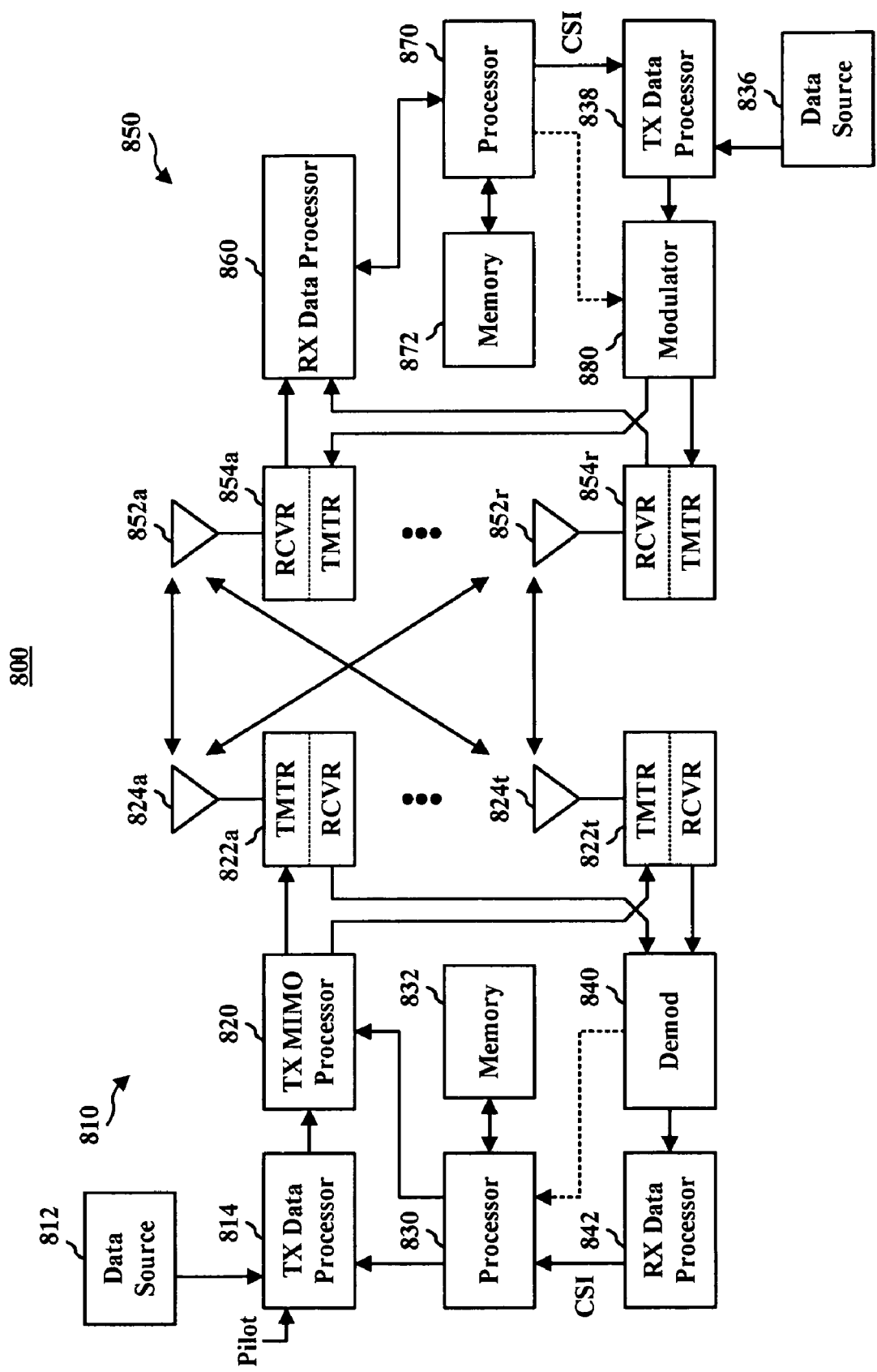
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-5)

and/or methods (FIGS. 6-7) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
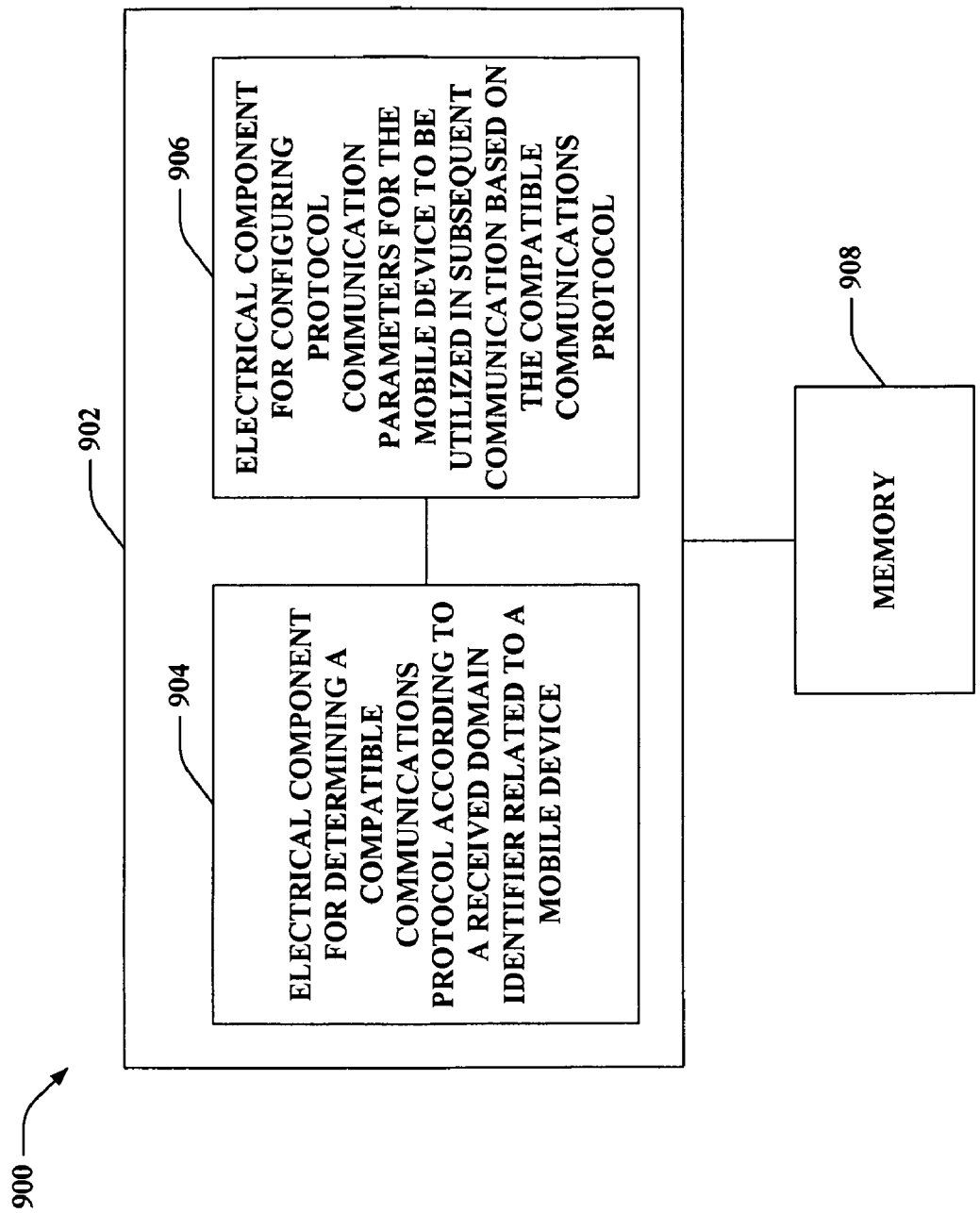
FIG. 9 is an illustration of an example system that assigns a protocol address to a mobile device following authentication in wireless communications.

With reference to FIG. 9, illustrated is a system 900 that establishes compatible protocol connections with mobile devices in wireless networks. For example, system 900 can reside at least partially within an AGW, AAA server, base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for determining a compatible communications protocol according to a received domain identifier related to a mobile device 904. For example, as described, a domain identifier can be received following successful authentication/authorization of a device. It can be received in a user profile, in one example, and can define one or more domains related to the mobile device or user thereof. Thus, compatible protocols can be determined related to the domains to ensure compatible communication protocols are utilized in further communicating in the domain of the wireless network. Further, logical grouping 902 can comprise an electrical component for configuring protocol communication parameters for the mobile device to be utilized in subsequent communication based on the compatible communications protocol 906. Thus, an IP address can be assigned, DNS server settings can be configured, etc., in response to a communications request from the mobile device. In this case, a protocol specified in the request can have been verified with those compatible with the domain. In another example, a list of compatible protocols can be sent to the device to facilitate requesting a compatible protocol. Additionally, system 900 can include a memory 908 that retains instructions for executing functions associated with electrical components 904 and 906. While shown as being external to memory 908, it is to be understood that one or more of electrical components 904 and 906 can exist within memory 908.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for providing protocol services based at least in part on a desired domain for a mobile device, comprising:
   receiving a domain identifier related to a user of a mobile device in a portion of a transmitted user profile from a first network entity following authentication/authorization of the mobile device via the first network entity at a first network layer;
   determining one or more protocols from a plurality of protocols according to the domain identifier, wherein the one or more protocols are compatible with a domain corresponding to the domain identifier;
   configuring communication parameters related to the one or more protocols for the mobile device to facilitate subsequent communication in the domain;
   establishing a communication session between the domain and the mobile device based at least in part on the one or more protocols and the configured communications parameters; and
   utilizing the configured communication parameters to authenticate the user of the mobile device via a second network entity at a second network layer, the second network layer being higher than the first network layer.

2. The method of claim 1, wherein the first network entity comprises an authentication, authorization, and accounting (AAA) server.

3. The method of claim 2, further comprising providing communication access to the AAA server for the mobile device.

4. The method of claim 2, wherein the second network entity comprises a visited AAA server.

5. The method of claim 2, further comprising transmitting an access request to the AAA server to authenticate and/or authorize the mobile device and receive the domain identifier.

6. The method of claim 5, wherein the domain identifier is received in an access accept message from the AAA server.

7. The method of claim 1, further comprising:
   receiving a request from the mobile device to establish the communication session based on a requested one or more protocols;
   denying establishment of the communication session when the requested one or more protocols are not compatible with the domain; and
   wherein the establishing of the communication session includes establishing when the requested one or more protocols are compatible with the domain.

8. A wireless communications apparatus, comprising:
   at least one processor configured to:
      determine one or more protocols from a plurality of protocols for a mobile device based at least in part on a received domain identification related to a user of the mobile device in a portion of a transmitted user profile from a first network entity following authentication/authorization of the mobile device via the first network entity at a first network layer, wherein the one or more protocols comprise communication protocols compatible with a domain corresponding to the received domain identification;
      configure communication parameters for the mobile device pursuant to the one or more protocols;
      establish a communication session between the domain and the mobile device based on the one or more protocols; and
      utilize the configured communication parameters to authenticate the user of the mobile device via a second network entity at a second network layer, the second network layer being higher than the first network layer; and
   a memory coupled to the at least one processor.

9. The wireless communications apparatus of claim 8, wherein the first network entity comprises an authentication, authorization, and accounting (AAA) server.

10. The wireless communications apparatus of claim 9, wherein the at least one processor is further configured to transmit an access request message to the AAA server to receive the domain identification.

11. The wireless communications apparatus of claim 10, wherein the domain identification is received in an access accept message transmitted in response to the access request message.

12. The wireless communications apparatus of claim 10, wherein the second network entity comprises a visited authentication, authorization, and accounting (AAA) server.

13. The wireless communications apparatus of claim 8, wherein the domain identification provides a desired domain to be utilized by the user of the mobile device.

14. The wireless communications apparatus of claim 8, wherein the at least one processor is further configured to:
   receive a request from the mobile device to establish the communication session based on a requested one or more protocols;
   deny establishment of the communication session when the requested one or more protocols are not compatible with the domain; and
   wherein the at least one processor is further configured to establish the communication session when the requested one or more protocols are compatible with the domain.

15. A wireless communications apparatus that establishes protocol communications with a wireless network mobile device, comprising:
- means for determining one or more protocols from a plurality of protocols according to a received domain identifier related to a user of a mobile device in a portion of a transmitted user profile from a first network entity following authentication/authorization of the mobile device via the first network entity at a first network layer, wherein the one or more protocols comprises compatible communications protocols with a domain corresponding to the received domain identifier;
- means for configuring protocol communication parameters for the mobile device to be utilized in subsequent communication based on the one or more protocols;
- means for establishing a communication session between the domain and the mobile device based at least in part on the one or more protocols and the configured protocol communication parameters; and
- means for utilizing the configured communication parameters to authenticate the user of the mobile device via a second network entity at a second network layer, the second network layer being higher than the first network layer.

16. The wireless communications apparatus of claim 15, wherein the first network entity comprises an authentication, authorization, and accounting (AAA) server.

17. The wireless communications apparatus of claim 16, further comprising means for authenticating the mobile device to facilitate communication between the mobile device and the AAA server.

18. The wireless communications apparatus of claim 15, wherein the second network entity comprises a disparate AAA server.

19. The wireless communications apparatus of claim 15, wherein the one or more protocols comprise at least one of a simple or mobile internet protocol (IP), and the configured protocol communication parameters include an IP address.

20. The wireless communications apparatus of claim 15, further comprising:
- means for receiving a request from the mobile device to establish the communication session based on a requested one or more protocols;
- means for denying establishment of the communication session when the requested one or more protocols are not compatible with the domain; and
- wherein the means for establishing of the communication session includes means for establishing when the requested one or more protocols are compatible with the domain.

21. A computer program product, comprising:
a non-transitory computer-readable medium comprising:
- code for causing at least one computer to receive a domain identifier related to a user of a mobile device in a portion of a transmitted user profile from a first network entity following authentication/authorization of the mobile device via the first network entity at a first network layer;
- code for causing the at least one computer to determine one or more protocols from a plurality of protocols according to the domain identifier, wherein the one or more protocols are compatible with a domain corresponding to the domain identifier;
- code for causing the at least one computer to configure communication parameters related to the one or more protocols for the mobile device to facilitate subsequent communication in the domain;
- code for causing the at least one computer to establish a communication session between the domain and the mobile device utilizing the one or more protocols and configured communications parameters; and
- code for causing the at least one computer to utilize the configured communication parameters to authenticate the user of the mobile device via a second network entity at a second network layer, the second network layer being higher than the first network layer.

22. The computer program product of claim 21, wherein the first network entity comprises an authentication, authorization, and accounting (AAA) server.

23. The computer program product of claim 22, wherein the computer-readable medium further comprises code for causing the at least one computer to provide communication access to the AAA server for the mobile device.

24. The computer program product of claim 21, wherein the second network entity comprises a visited AAA server.

25. The computer program product of claim 22, wherein the computer-readable medium further comprises code for causing the at least one computer to transmit an access request to the AAA server to authenticate and/or authorize the mobile device and receive the domain identifier.

26. The computer program product of claim 25, wherein the domain identifier is received in an access accept message from the AAA server.

27. The computer program product of claim 21, wherein the computer-readable medium further comprises code for causing the at least one computer to:
- receive a request from the mobile device to establish the communication session based on a requested one or more protocols;
- deny establishment of the communication session when the requested one or more protocols are not compatible with the domain; and
- wherein the code for establishing of the communication session includes code for establishing when the requested one or more protocols are compatible with the domain.

* * * * *